United States Patent [19]

Macht et al.

[11] Patent Number: 4,480,713
[45] Date of Patent: Nov. 6, 1984

[54] OPERATOR RESTRAINT/CONTROL LOCKOUT SYSTEM

[75] Inventors: Jon A. Macht; Mike D. Jines, both of Owatonna, Minn.

[73] Assignee: Owatonna Manufacturing Company, Inc., Owatonna, Minn.

[21] Appl. No.: 442,233

[22] Filed: Nov. 16, 1982

[51] Int. Cl.³ .......................................... B60R 21/10
[52] U.S. Cl. ................................... 180/268; 180/271; 280/801
[58] Field of Search .............. 180/268, 269, 270, 271; 280/801

[56] References Cited

U.S. PATENT DOCUMENTS

| | | | |
|---|---|---|---|
| 3,154,167 | 10/1964 | Butler et al. | 280/801 |
| 4,132,434 | 1/1979 | Takahashi et al. | 280/801 |
| 4,388,980 | 6/1983 | Vig et al. | 180/269 |
| 4,391,344 | 7/1983 | Weber et al. | 180/269 |
| 4,397,371 | 8/1983 | Lynnes et al. | 180/269 |

OTHER PUBLICATIONS

Clark Equipment Company, "700 Series Bobcat", p. 3, Melroe Division, Fargo, ND 58102.

Sperry New Holland, a Division of Sperry Corporation, "Skid-Steer Loader, Model L-555", 1981, p. 3.
Gehl Company, "Gehl 3510/3610 Skid Steer Loaders", Gehl Company, West Bend, WI 53095.

Primary Examiner—David M. Mitchell
Assistant Examiner—Kenneth R. Rice
Attorney, Agent, or Firm—Merchant, Gould, Smith, Edell, Welter & Schmidt

[57] ABSTRACT

The specification discloses a seatbelt-activated operator restraint/control lockout system (40) which is particularly adapted for use with industrial vehicles such as skid-steer loaders. A pivotal arm (46) connected to one side of the seatbelt (36) is moveable between a forward position corresponding to the seatbelt being fastened, and a rearward position corresponding to the seatbelt being unfastened. The pivot arm (46) is normally biased by a spring (74) to the rearward position, and means (70, 78) are provided for selectively locking out a control valve (86) against operation except when the pivot arm is in the forward position. A second embodiment (112) of the invention is particularly adapted for use with solenoid-activated control valves.

12 Claims, 7 Drawing Figures

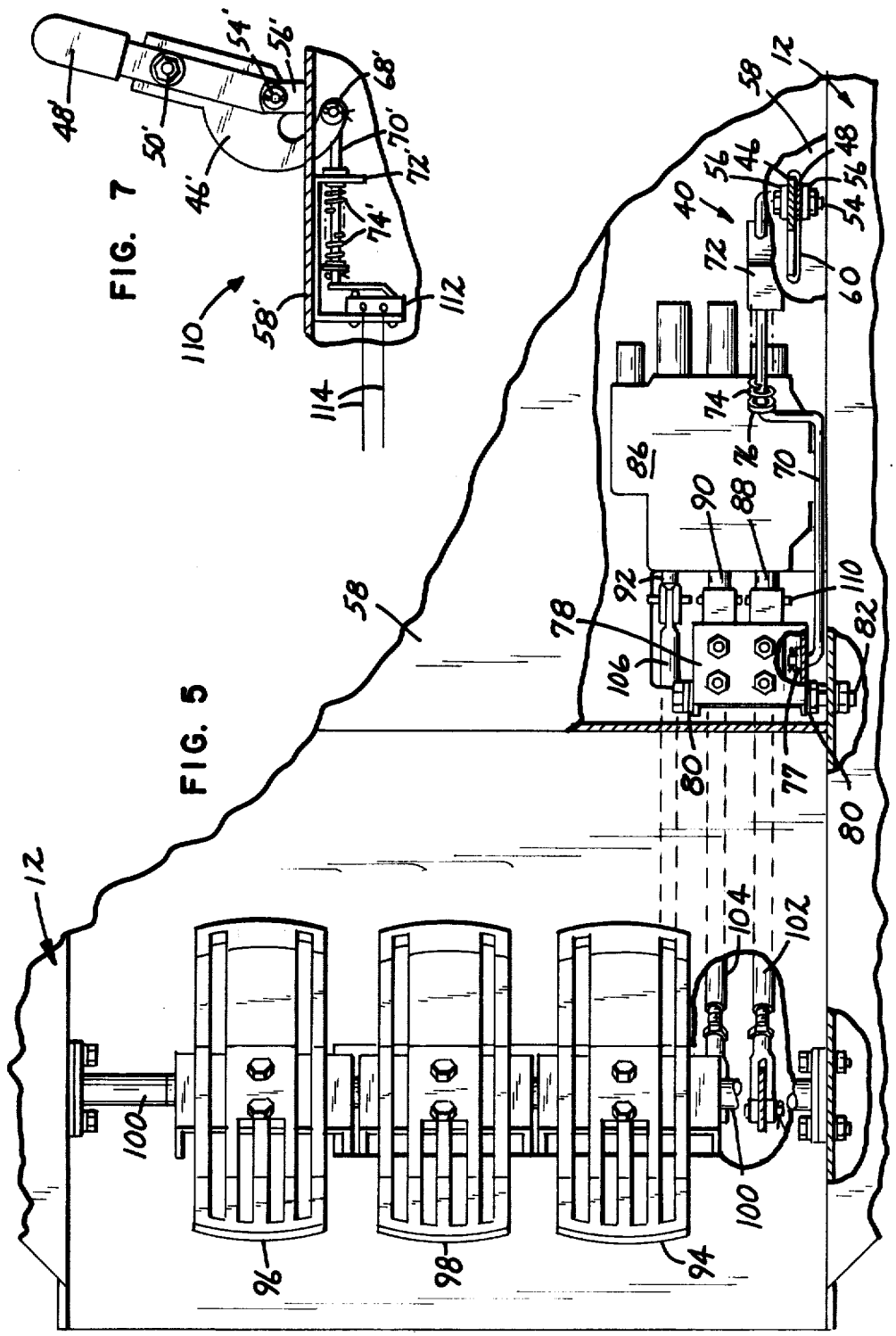

OPERATOR RESTRAINT/CONTROL LOCKOUT SYSTEM

TECHNICAL FIELD

The present invention relates generally to a safety system for operators of industrial vehicles, and more particularly to a seatbelt-activated system adapted for locking out predetermined controls of a skid-steer loader responsive to fastening of the seatbelt by the operator.

BACKGROUND ART

There are various types of industrial vehicles in use today, and one of the most popular of these is the skid-steer loader. A skid-steer loader is a compact, highly maneuverable vehicle in which the wheels on opposite sides of the vehicle are independently driven through hydrostatic transmissions. Maneuvering is accomplished by driving the wheels on each side of the vehicle at different speeds and/or in different directions. The operator sits in front of the engine and between the arms of a hydraulically operated boom on which a bucket, grapple fork, rake, auger or other accessory can be mounted. A cab or roll cage is usually provided about the operator's compartment for protection.

Seatbelts traditionally have been provided for restraining the operator in the vehicle during operation. Seatbelts, of course, depend upon the operator to fasten them so that they can serve their intended purpose. Accidents and injuries have occurred when operators were not wearing their seatbelts and were pitched forward. Moreover, heretofore the functions of seatbelts and control interlocks have not been interrelated.

Other than encouraging operators to wear their seatbelts, attempts have been made to develop auxiliary restraint systems and/or control interlock systems for improving safety. Such control interlock systems are especially desireable in skid-steer loaders where the operators must climb into and out of their seats from the front of the vehicles and directly over the controls. For example, the Bobcat loader available from the Melroe Division of Clark Equipment Company utilizes a pivotal seat bar. When the bar is in the up position, the foot pedals and the boom lift arms are locked and the operator can easily enter or exit the vehicle. When the seat bar is down, the controls are unlocked and the bar provides additional protection against the operator pitching forward during operation of the vehicle. This type of restraint system, however, is completely independent of the seatbelt, and does not function in any way to encourage the operator to fasten his seatbelt as well. Moreover, this type of swing down seat bar is somewhat unwieldy and expensive.

Seat-activated devices also have been utilized heretofore, however, these have certain disadvantages. For example, the skid-steer loaders from Sperry New Holland incorporate seat-activated systems which deactivate the boom hydraulics if the operator comes off the seat for any reason. Such systems are extremely sensitive to bouncing of the operator in the seat. Operation by a lightweight operator and/or over rough terrain can cause multiple cycling leading to increased wear and maintenance. Again, operation of this type system is completely independent of the seatbelt.

There is thus a need for an improved operator restraint/control lockout system of unobtrusive construction which functions to positively lockout predetermined controls of the vehicle unless the seatbelt is properly fastened.

SUMMARY OF INVENTION

The present invention comprises a seatbelt-activated system which overcomes the foregoing and other difficulties associated with the prior art. In accordance with the invention, there is provided a seatbelt activated operator restraint/control lockout system which is particularly adapted for use with a skid-steer loader and which provides positive lockout of predetermined controls, such as the lift arm control valves, when the seatbelt is not properly fastened. The system includes a pivot arm adapted for connection at one end to one side of the seatbelt. The other end of the pivot arm is connected by a linkage to a catch plate moveable between locked and unlocked positions with respect to the control valve. The pivot arm is normally urged by a spring to a rearward position wherein the catch plate locks the spool(s) of the control valve against movement by the pedals. Properly fastening the seatbelt causes the pivot arm to move to a forward position wherein the catch plate is lifted out of interfering engagement with the control valve, freeing it for operation by manual controls.

BRIEF DESCRIPTION OF DRAWINGS

A better understanding of the invention can be had by reference to the following Detailed Description in conjunction with the accompanying Drawings, wherein;

FIG. 5 is a top view of the invention;

FIG. 7 is a diagram of an alternate embodiment of the invention.

DETAILED DESCRIPTION

Figure 1:
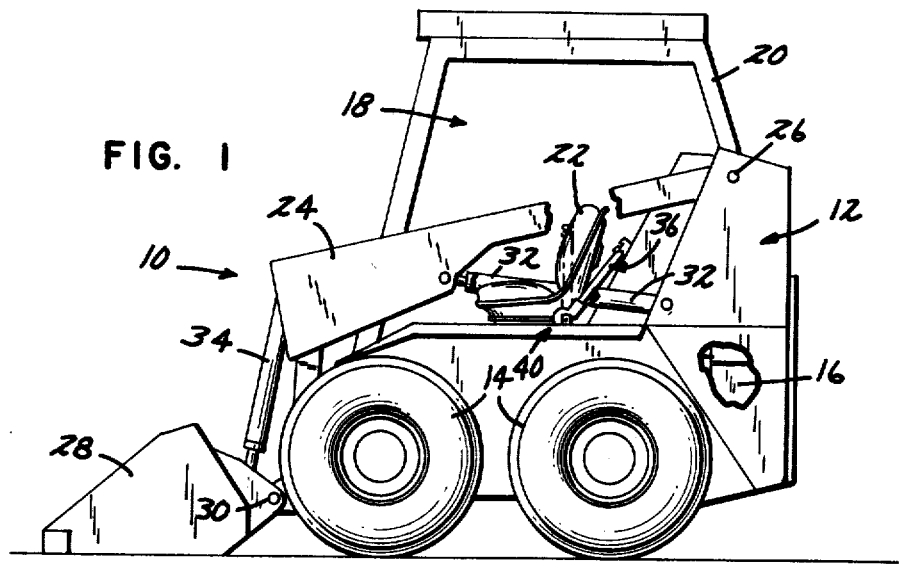
FIG. 1 is a side view of a skid-steer vehicle for which the safety system of the invention is particularly adapted.

Referring now to the Drawings, wherein like reference numerals designate like or corresponding elements throughout the views, and particularly referring to FIG. 1 there shown a skid steer vehicle 10 for which the operator restraint/control lockout system of the invention is particularly adapted. The skid-steer vehicle 10 includes a frame 12 with a set of wheels 14 mounted on each side thereof on a relatively short wheel base. A rear mounted engine 16 independently drives the wheels 14 on each side by means of hydrostatic transmissions (not shown).

An operators compartment 18 is defined by a roll cage 20 and seat 22 located between a pair of lift arms 24. The inner ends of the lift arms 24 are pivoted at points 26 to upright portions of the frame 12 behind the operators compartment 18. An implement such as a bucket 28 is pivoted to the outer ends of the lift arms 24 at points 30. Raising and lowering of the lift arms 24 is accomplished by means of double-acting cylinders 32, while cylinders 34 are provided for tilting the bucket 28. Suitable controls including foot pedals and a T-bar handle or hand levers (not shown) are provided inside the operators compartment 18 for controlling the skid steer vehicle 10. Also provided is a seatbelt 36 which functions in conjunction with the seatbelt activated operator restraint/control lockout system 40 of the invention, as will be explained more fully hereinafter, to provide a positive mechanical lockout of the valve controlling the cylinders 32 and 34 when the seatbelt is not properly fastened.

Figure 2:
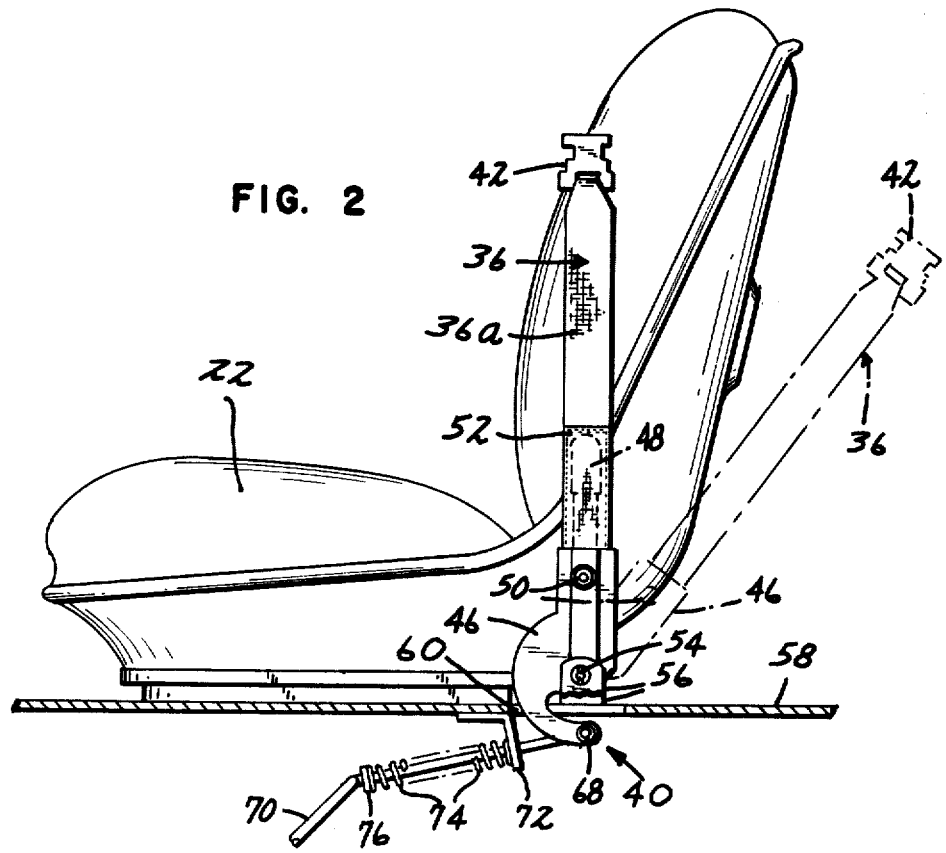
FIG. 2 is an enlarged side view of the operator's seat relative to a portion of the system herein.
Figure 3:
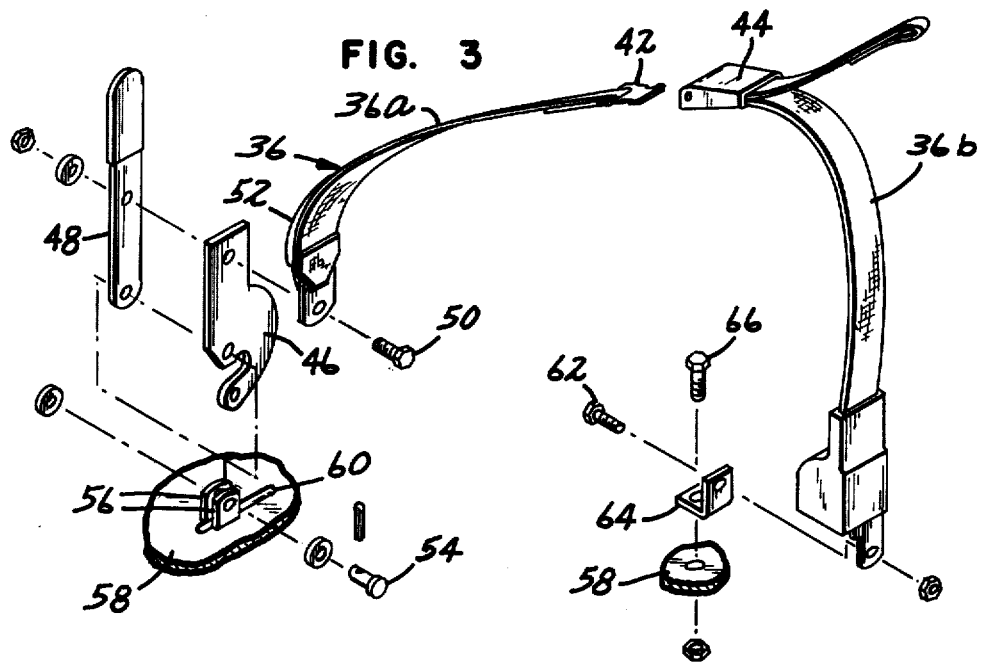
FIG. 3 is an exploded perspective view of the seatbelt connections.

FIGS. 2 and 3 illustrate the connection between the seatbelt 36 and the operator restraint/control lockout system 40. The seatbelt 36 includes two sides or portions 36a and 36b. The seatbelt portion 36a is of fixed length and includes a tongue 42 adapted for receipt by buckle 44 of the other seatbelt portion 36b, which is of adjustable length. The other ends of the seatbelt portions 36a and 36b are secured to frame 12. In particular, portion 36a is secured to a pivot arm 46 and a flat spring 48 by means of a fastener 50. The upper end of the flat spring 48 is adapted to fit into a pocket 52 formed at the lower end of the seatbelt portion 36a. The purpose of spring 48 is to present part of the seatbelt 36 for the convenience of the operator. The lower end of the seatbelt portion 36a, the pivot arm 46 and the flat spring 48 are thus rigidly interconnected by the fastener 50. The arm 46 and spring 48 in turn are pivoted by a common pin 54 to a support bracket 56 mounted on a seat plate 58. The pivot arm 46 extends through a slot 60 in plate 56 and connects to the remainder of system 40. The lower end of the other seatbelt portion 36b is secured by a fastener 62 to a bracket 64 which is anchored to plate 58 by another fastener 66.

It will thus be understood that one end of the seatbelt 36 is secured to a fixed bracket 64, while the other end is attached to a pivot arm 46. Brackets 56 and 64 are laterally spaced apart and preferably located well back with respect to the operator seat 22 so that pivotal positioning of the pivot arm 46 will vary in accordance with whether the seatbelt 36 is properly fastened. The position of the pivot arm 46 in turn controls the locked or unlocked condition of the remainder of system 40 as will be explained below.

Figure 4:
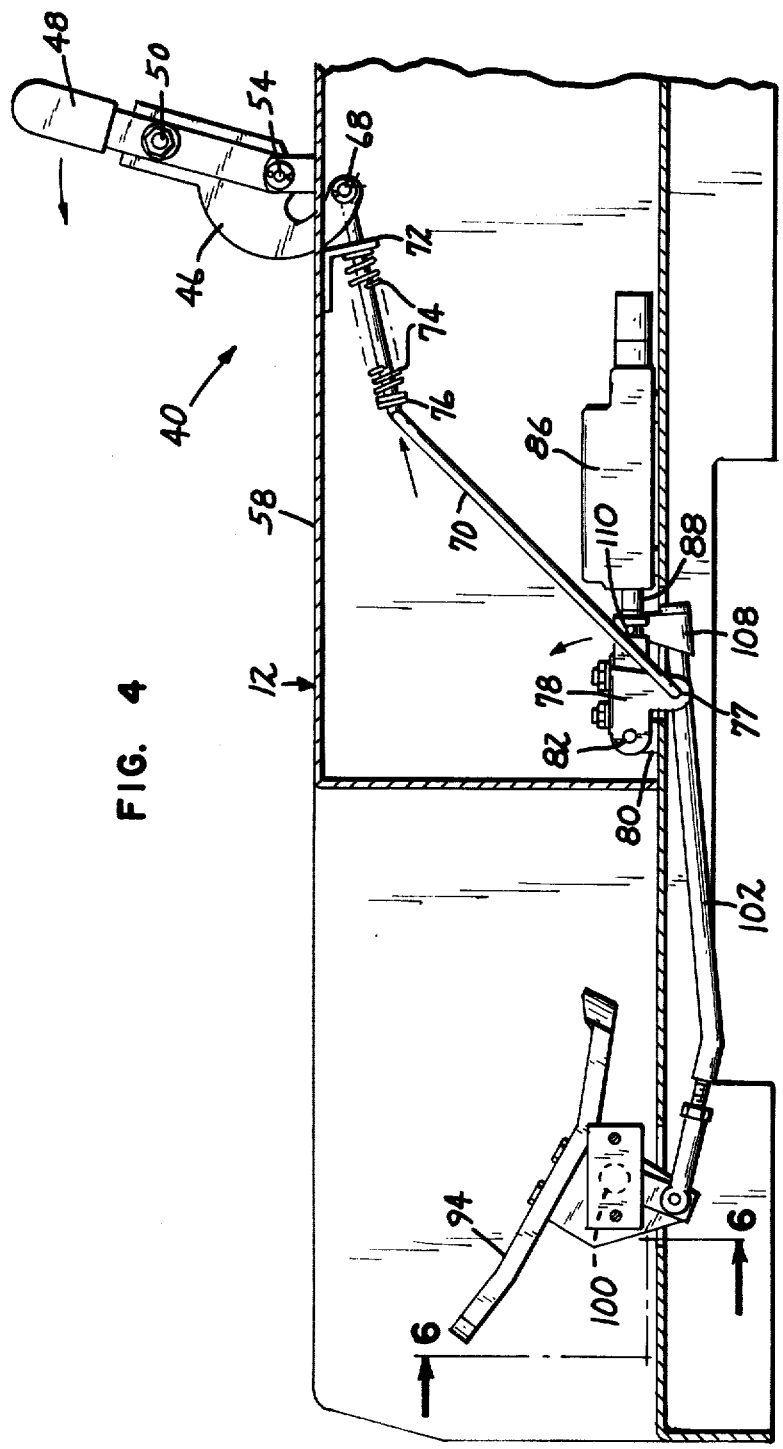
FIG. 4 is a side view of the invention.

Referring now to FIGS. 4 and 5 in conjunction with FIG. 2, the lower end of the pivot arm 46 is pivoted at point 68 to one end of a rigid link 70. The link 70 extends through an opening in a bracket 72, and a compression spring 74 is provided between the bracket and a follower 76 on the bent link for purposes of normally biasing the pivot arm 46 backward relative to seat 22.

The other end of link 70 is pivoted at point 77 to a catch plate 78, which in turn is connected to a mounting bracket 80 by means of a pin 82. The bracket 80 is mounted on a floor plate 84 of the frame 12. It will thus be apparent that there is a direct mechanical connection between arm 46 and catch plate 78, and that the spring 74 normally biases the arm backwards and the plate downwards.

Figure 6:
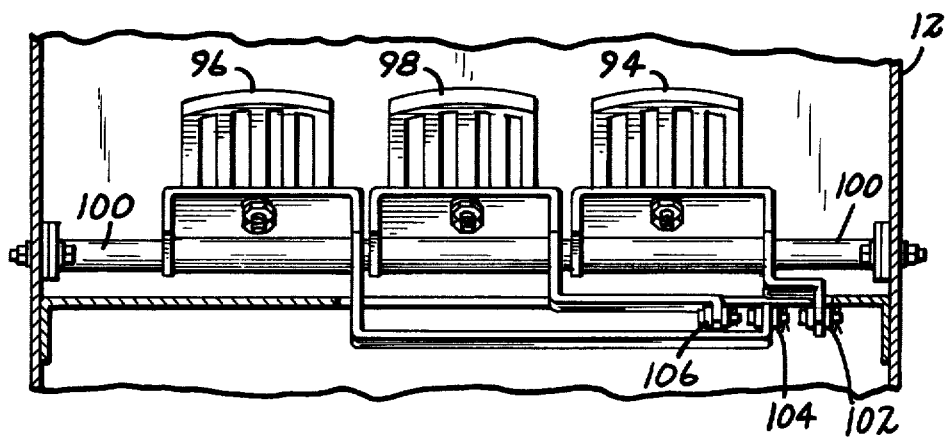
FIG. 6 is an end view of the foot pedal control linkages.

Referring now to FIG. 6 in conjunction with FIGS. 4 and 5, the catch plate 78 is located adjacent to a control valve 86. As illustrated, valve 86 controls operation of the lift arms 24 and the bucket 28 or any other accessory mounted thereon. In particular, the control valve 86 includes three spools 88, 90 and 92 which are independently moveable by the operator to control flow of hydraulic fluid to the cylinders 32 and 34, and thereby control operation of the lift arms and/or any implement mounted thereon. Such control is typically accomplished by means of foot pedals 94, 96 and 98 while speed and directional control of the vehicle is maintained via a T-bar handle or other hand controls (not shown).

The pedals 94, 96 and 98 are pivoted about a common shaft 100 extending between spaced apart sidewalls of the frame 12. Pedals 94, 96 and 98 are respectively coupled to their valve spools 88, 90, 92 by linkages 102, 104 and 106. Each of the linkages 102, 104 and 106 is preferably connected to its corresponding valve spool by means of a stirrup and cross member to provide the requisite clearance with the catch plate 78. For example, as is best seen in FIG. 4, a stirrup 108 and cross member 110 are provided at the interconnection between linkage 102 and valve spool 88, which typically controls the tilt cylinders 34. Similar stirrups and cross members are provided at the point of the interconnection between linkage 104 and valve spool 90, which typically controls the lift cylinder 32, and at the point of interconnection of the linkage 106 and valve spool 92, which typically controls actuation of an auxiliary device, such as an auger, grapple or the like mounted on the ends of the lift arms 24. The cross members on valve spools 88 and 90 are received in notches formed in the catch plate 78 to facilitate mechanical lockout of valve 86 with its valve spools in their neutral positions.

As illustrated, only the valve spools 88 and 90 for the lift and tilt cylinders of the lift arms 24 are affected by the catch plate 78 because it is sometimes desirable to leave the other valve spool 92 free so that the auxiliary device can be operated while the operator is outside the vehicle 10, however, only one of the valve spools or all three of the valve spools can be locked-out in this manner, if desired.

The seatbelt-activated operator restraint/control lockout system 40 of the invention operates as follows. When the seatbelt 36 is unfastened, either with or without the operator seated in seat 22, the spring 74 urges link 70 away from bracket 72 such that the catch plate 78 is normally urged toward a down and locked position as shown in FIG. 4, while the pivot arm 46 is simultaneously urged backwardly toward the position shown in phantom lines in FIG. 2. When seatbelt 36 is unfastened, the normal condition of system 40 is thus for the valve spools 88 and 90 of control valve 86 to be mechanically locked in their neutral positions such that the cylinders 32 and 34 can not inadvertently be actuated by pedal 94 and 98, as might otherwise happen as the operator is entering or exiting compartment 18. This condition is maintained until the operator is seated in seat 22 with the seatbelt 36 properly fastened. In properly fastening seatbelt 36, the operator must pull the portion 36a forwardly and thus move the pivot arm 46 and link 70 against spring 74 so that the catch plate 78 is lifted out of locking engagement with the control valve 86. The spring 74 returns the catch plate 78 to its normal down and locked position upon release of the seatbelt 36.

Referring now to FIG. 7, there is shown an operator restraint/control lockout system 112 incorporating a second embodiment of the invention. The system 112 includes some components which are substantially identical in construction and operation to components of the system 40 illustrated in FIGS. 2-6. Such identical components are designated in FIG. 7 with the same reference numerals utilized in the description of system 40, but are differentiated therefrom by means of a prime (') notation.

The primary distinction between the two embodiments comprises the fact that system 112 is adapted for use with a system having an electrically or hydraulically actuated control valve instead of a mechanically actuated control valve. In particular, link 70' has been adapted to function as a plunger for engaging the contactor of a switch 114, which can be an electric switch, solenoid valve, or a hydraulic valve. The on or off signals from switch 114 are transmitted through lines 116 to the lift cylinders 32 and preferably also to the tilt cylinders 34. Spring 74 normally urges the pivot arm 46' such that the plunger or the link 70' is out of contact with the switch 114 which is thus deactivated. Otherwise, the system 112 is similar in function and operation to system 40 described above.

From the foregoing, it will thus be apparent that the present invention comprises an operator restraint/control lockout system having numerous advantageous over the prior art. Instead of using an auxiliary device which functions separately and independently of the seatbelt, the system herein is seatbelt-activated such that certain predeterminded controls are postively locked out against operation unless the seatbelt is properly fastened by the operator. The system herein is not sensitive to weight variations of the operator or bouncing of the operator in the seat. Other advantages will be evident to those skilled in the art.

Although particular embodiments of the invention have been illustrated in the accompanying Drawings and described in the foregoing Detailed Description, it will be understood that the invention is not limited to the specific embodiments disclosed, but is intended to embrace any alternatives, equivalents, modifications and/or rearrangements of elements following within the scope of the invention as defined by the claims.

We claim:

1. An operator restraint/control lockout system for a vehicle having a seat and a power device actuated by a control valve, comprising:
   a seatbelt including a pair of seatbelt portions disposed on opposite sides of the seat, one seatbelt portion being fixed to the vehicle;
   means for releasably fastening said seatbelt portions together;
   a pivot arm connected to the other seatbelt portion;
   said pivot arm being mounted for pivotal movement about a generally transverse axis between a forward position corresponding to fastened condition of said seatbelt across the seat, and a rearward position corresponding to unfastened condition of said seatbelt;
   means for normally biasing said pivot arm toward the rearward position; and
   means responsive to pivotal positioning of said pivot arm for selectively disabling the control valve when said arm is in the rearward position.

2. The system of claim 1, wherein the vehicle comprises a skid-steer loader.

3. The system of claim 1, wherein the control valve is of the solenoid actuated type, and wherein said means for selectively disabling the control valve comprises;
   an electric switch coupled to said control valve, said switch having a contact arm movable between on and off positions; and
   a plunger connected to pivotal arm and moveable therewith relative to the contact arm of said switch.

4. An operator restraint/control lockout system for a vehicle having a seat and a power device actuated by a control valve, comprising:
   the control valve including at least one spool moveable with respect to a neutral position;
   a seatbelt including a pair of seatbelt portions disposed on opposite sides of the seat, one seatbelt portion being fixed to the vehicle;
   means for releasably fastening said seatbelt portions together;
   a pivot arm connected to the other seatbelt portion;
   said pivot arm being mounted for pivotal movement between a forward position corresponding to fastened condition of said seatbelt, and a rearward position corresponding to unfastened condition of said seatbelt;
   means for normally biasing said pivot arm toward the rearward position;
   a pivotal catch plate disposed adjacent to the control valve, said catch plate being mounted for pivotal movement between a raised position out of engagement with the valve spool and a lowered position in locking engagement with the spool in its neutral position; and
   means for mechanically interconnecting said pivotal arm and catch plate.

5. In a vehicle of the type having a seat for the operator and a foot pedal connected to the moveable spool of a control valve for controlling a fluid powered device, an operator restraint/control lockout system, comprising:
   a pair of seatbelt portions disposed on opposite sides of the seat, one of said seatbelt portions being connected to the vehicle;
   means for releasably fastening said seatbelt portions together;
   a pivotal arm connected to the other seatbelt portion;
   said pivotal arm being mounted for pivotal movement between a forward position corresponding to said seatbelt being fastened, and a rearward position corresponding to said seatbelt being unfastened;
   a pivotal catch plate disposed ajacent to said control valve and adapted for selective engagement with the spool thereof;
   said pivotal catch plate being mounted for pivotal movement between a raised position out of engagement with the valve spool, and a lowered position in locking engagement with the valve spool;
   means for mechanically interconnecting said pivotal arm and catch plate; and
   means for normally biasing said arm toward the rearward position such that the valve spool is locked in a neutral position by said catch plate when said seatbelt is unfastened.

6. The system of claim 5, wherein the vehicle is a skid-steer loader.

7. The system of claim 5, wherein said means mechanically interconnecting pivotal arm and catch plate comprises a rigid link coupled therebetween.

8. The system of claim 5, wherein said biasing means comprises:
   a fixed bracket;
   a follower mounted for movement with said means for mechanically interconnecting said pivotal arm and catch plate; and
   a spring connected between said bracket and follower.

9. An operator restraint/control lockout system for a skid-steer loader, which comprises;
   a seat for the operator;

a seatbelt including pair of separable seatbelt portions disposed on opposite sides of said seat, one of said seatbelt portions being fixed to the loader;

a pivotal control arm connected to the other seatbelt portion;

said arm being mounted for pivotal movement between a forward position when said seatbelt is fastened, and a rearward position when said seatbelt is unfastened;

control valve means adapted for controlling at least one fluid powered device on the loader responsive to manual input from the operator;

means for selectively locking said control valve means in a neutral position responsive to positioning of said pivotal control arm; and means for normally biasing said pivotal control arm toward the rearward position such that said control valve means is locked out when said seatbelt is unfastened.

10. The system of claim 9, wherein said control valve means includes at least one spool movable to and from a neutral position, and wherein said means for selectively disabling said control valve means comprises:

a pivotal catch plate disposed adjacent to said control valve means and adapted for selective engagement with the spool thereof;

said catch plate being mounted for pivotal movement between a raised position out of engagement with the valve spool, and a lowered position in locking engagement with the valve spool; and a rigid link coupled between said pivotal control arm and catch plate.

11. The system of claim 9, wherein the control valve is of the solenoid actuated type, and wherein said means for selectively locking said control valve comprises;

an electric switch coupled to said control valve, said switch having a contact arm movable between on arm and off positions; and a plunger connected to pivotal arm and moveable therewith relative to the contact arm of said switch.

12. In a vehicle of the type having a seat for the operator and a foot pedal connected to the moveable spool of a control valve for controlling a fluid powered device, an operator restraint/control lockout system comprising:

a pair of seatbelt portions disposed on opposite sides of the seat, one of said seatbelt portions being connected to the vehicle;

means for releasably fastening said seatbelt portions together;

a pivotal arm connected to the other seatbelt portion;

said pivotal arm being mounted for pivotal movement about a generally transverse axis between a forward position corresponding to said seatbelt being fastened across the seat, and a rearward position corresponding to said seatbelt being unfastened across the seat;

a pivotal catch plate disposed adjacent to said control valve and adapted for selective engagement with the spool thereof;

said pivotal catch plate being mounted for pivotal movement between a raised position out of engagement with the valve spool, and a lowered position in locking engagement with the valve spool;

means for mechanically interconnecting said pivotal arm and catch plate; and means for normally biasing said arm toward the rearward position such that the valve spool is locked in a neutral position by said catch plate when said seatbelt is unfastened.

* * * * *